United States Patent [19]

Nose et al.

[11] Patent Number: 5,074,774
[45] Date of Patent: Dec. 24, 1991

[54] WEIGHT SCALING MATERIAL SUPPLYING APPARATUS FOR A POWDER MOLDING MACHINE

[75] Inventors: Norio Nose; Hiroshi Haguchi; Kaoru Kawasaki, all of Okayama, Japan

[73] Assignee: Kabushiki Kaisha Mitsuishi Fukai Tekkosho, Bizen, Japan

[21] Appl. No.: 557,843

[22] Filed: Jul. 26, 1990

[30] Foreign Application Priority Data

Aug. 10, 1989 [JP] Japan .................................. 1-205639

[51] Int. Cl.⁵ ...................... B29C 31/06; B29C 43/34
[52] U.S. Cl. .................................. 425/148; 264/40.4; 425/200; 425/219; 425/260; 425/448
[58] Field of Search ............... 425/148, 260, 431, 448, 425/200, 219; 264/40.4

[56] References Cited

U.S. PATENT DOCUMENTS

| 759,259 | 5/1904 | Flood | 425/260 |
|---|---|---|---|
| 1,568,832 | 1/1926 | Harrison et al. | 425/448 |
| 2,270,829 | 1/1942 | Wellnitz | 425/260 |
| 3,076,229 | 2/1963 | Arpajian | 425/448 |
| 3,166,814 | 1/1965 | O'Donnell et al. | 425/148 |
| 3,407,458 | 10/1968 | Reckman et al. | 425/448 |
| 3,499,069 | 3/1970 | Seigle | 425/148 |
| 3,604,075 | 9/1971 | Locke et al. | 425/148 |

FOREIGN PATENT DOCUMENTS 2605514 8/1977 Fed. Rep. of Germany ...... 425/260

Primary Examiner—James C. Housel
Attorney, Agent, or Firm—Armstrong, Nikaido, Marmelstein, Kubovcik & Murray

[57] ABSTRACT

A material supplying apparatus for a powder molding machine including a press table, a charger frame movable to reciprocate on the press table, a device for reciprocating the charger frame, a material inputting device provided on the charger frame into which a powder material is supplied, a scaling device for previously scaling the powder material to a predetermined weight, the device for scaling including a load cell, and rotary blades attached to a vertical shaft positioned in order to stir the material supplied to the material inputting device. The reciprocating device for the charger frame coupled to the material inputting device comprises a first cylinder which is reciprocated on the press table. A shutter plate is arranged between the material inputting device and the table in slide contact with both the material inputting device and the table through dust seals for opening and closing openings of the material inputting device. A second cylinder is interposed between the shutter plate and the charger frame.

4 Claims, 5 Drawing Sheets

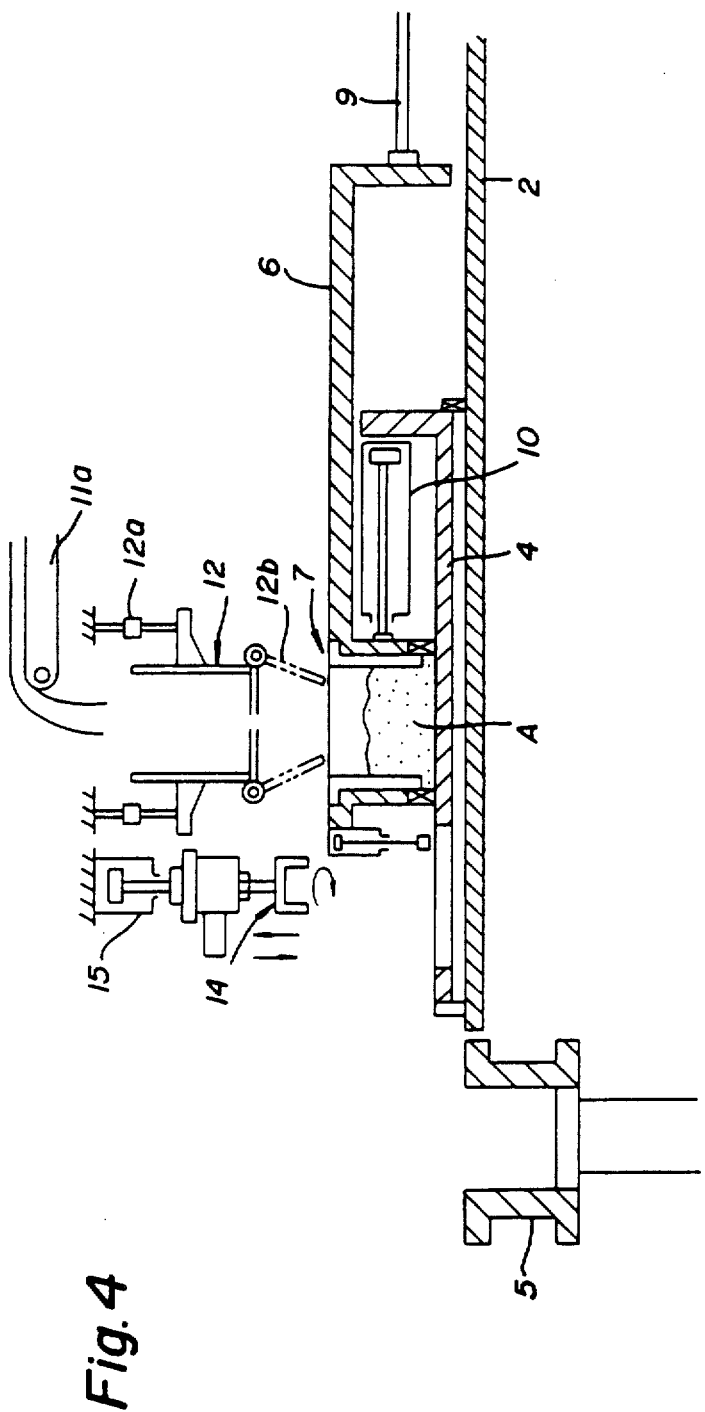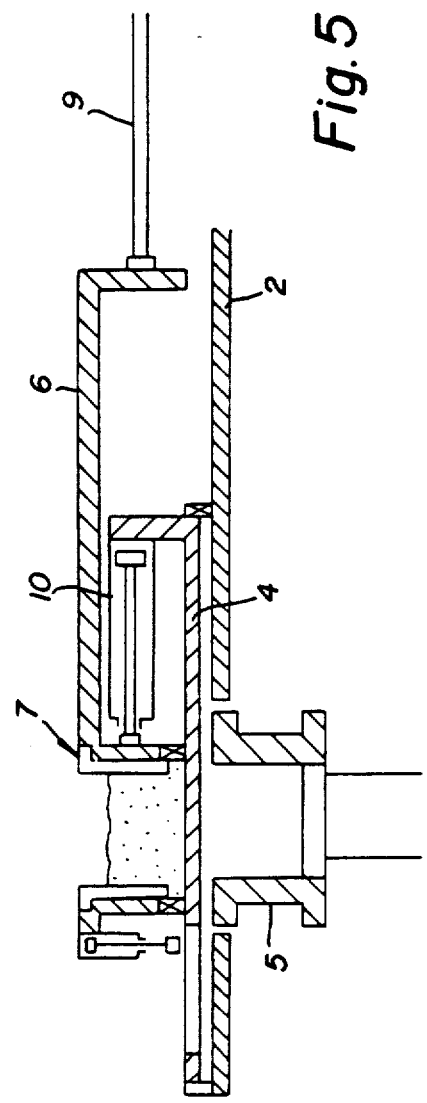

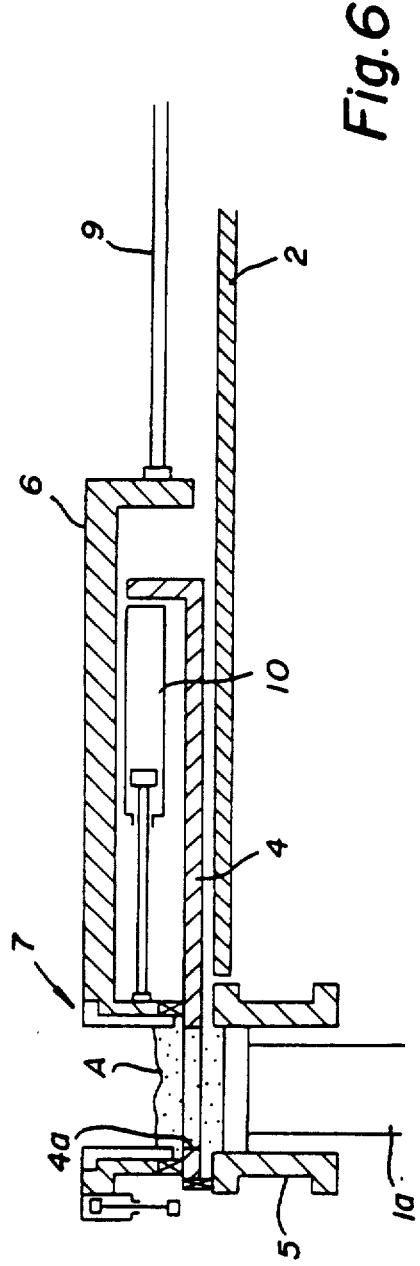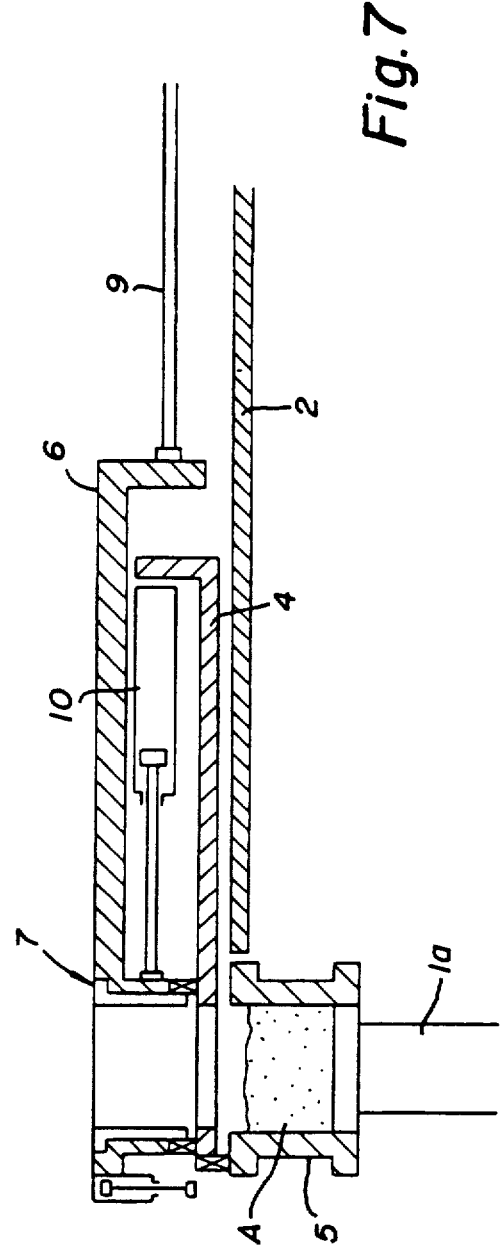

WEIGHT SCALING MATERIAL SUPPLYING APPARATUS FOR A POWDER MOLDING MACHINE

BACKGROUND OF THE INVENTION

The present invention relates to a measuring apparatus for supplying material to a powder molding machine for molding articles, for example, firebricks.

Apparatuses for supplying powder material to such a molding machine are mainly classified into one of two types, that is, a weight measuring type and a volume measuring or "cutting-out" type.

One such weight measuring type apparatus for supplying powder to a molding machine comprising a measuring device 12 having at least one load cell 12a (shown in FIG. 9) is mainly used in conjunction with a pressing machine using a so-called "die movement truck system", in which a die 5 is moved by a truck.

The volume measuring type supplying apparatus for a molding machine comprises in part, as shown in FIG. 10, a hopper 11, a material inputting device 7A, and a cylinder 10. The supplying apparatus is applied to a pressing machine using a so-called "die floating type central molding system", in which the die 5 is elevated by a floating cylinder 16 as in FIG. 1.

Any conclusions about superiority or inferiority of the weight measuring type and the volume measuring or cutting-out type have not been obtained yet, at the present stage. This is because both types have merits and demerits, respectively. Also, molding conditions largely fluctuate depending on grain size and/or composition of powder material, kind of binder, etc which means that the effects of the type of supplying apparatus are masked.

With respect to the above-mentioned concepts, the applicant has already proposed a volume measuring type apparatus for supplying material in which the possibility of occurrence of material segregation (massive forming phenomenon) can be reduced for any material and measuring errors can be also reduced.

However, in recent years, error conditions (tolerance levels) are very severe and/or critical. For instance, in the case of a brick having a weight of 5 kg., an error (tolerance limit) of the dimension in the thickness direction must be within a range of ±0.2 mm and its value must be measured on the basis of the condition in which a material is most densely filled. In the conventional technique, change of firebrick weight upon firing is more than 20 g. Therefore, it is very difficult to fulfill such severe and/or critical conditions required in molding firebricks.

In the case of the volume measuring type apparatus, even if the accuracy is raised, there is a limitation, that is, the thickness of brick is set so as to lie within a range of ±0.5 to 1%. In other words, in the case of a brick weight of 5 kg., the tolerance of the thickness dimension is set so is to lie within a range from 0.5 to 1 mm. In addition, the above-mentioned conditions must be fulfilled in a state that the material is most densely filled. Therefore, in a case that only a volume measuring type supplying apparatus is used, the above-mentioned severe and/or critical conditions and tolerance levels cannot be fulfilled. In other words, a weight measuring type supplying apparatus is needed in such a case.

In the case of forming a relatively small brick, from a viewpoint of the productivity, the small brick must be molded efficiently. For this purpose, even if the measuring device 12 comprising the load cell 12a shown in FIG. 9 is applied to a volume type charger attached to, for example, the central molding pressing machine, a distance L (refer to FIG. 1) between the pressing devices, that is, an idle stroke needs to be largely increased. Also, stirring blade devices, which are provided as a countermeasure for the segregation or the like, are necessary. It is very difficult to attach those devices to the pressing machine which does not comprise such the devices.

In consideration of the above-mentioned circumstances, techniques conventionally have been demanded such that measuring errors in weight can be reduced to be as small as possible by using a load cell, segregation can be prevented, a drop height between an outlet of material supply means and a die can be reduced to as small a distance as possible, a movement surface which comes in contact with the material can be reduced to be as small as possible (since a hard material such as a grinding material or the like is frequently used as such the material), an amount of drop-out of the material can be minimized, and a tapered surface can be preliminarily formed to an surface of the supplied material (because a molded brick generally has a tapered surface). In order to improve productivity, it is desirable to utilize a pressing machine of a so-called "die floating central molding" type.

SUMMARY OF THE INVENTION

The present invention is proposed to fulfill the above-mentioned requirements. It is an object of the invention to provide a measuring type apparatus for supplying material to a powder molding machine in which weight errors (measuring errors in weight) of products can be reduced and productivity can be improved.

According to the present invention, a measuring type apparatus for supplying material to a powder molding machine is provided, which comprises: a press table; a charger frame movable to reciprocate on the press table; means to reciprocate the charger frame; a material inputting device provided on the charger frame into which a powder material is supplied; a scaling means for previously scaling the powder material to a predetermined weight, the means for scaling including a load cell; and rotary blades attached to a vertical shaft positioned in order to stir the material supplied to the material inputting device.

Also, a measuring type apparatus for supplying material to a powder molding machine according to the present invention can further comprise the charger frame being coupled to the material inputting device; a first cylinder which is horizontally reciprocated on the charger frame; a shutter plate arranged between the material inputting device and the table in slide contact with both the material inputting device and the table through dust seals for opening and closing the material inputting device; and a second cylinder interposed between the shutter plate and the charger frame.

Further, a measuring type apparatus for supplying material to a powder molding machine of the present invention has a tapered surface forming means for forming a tapered surface on the powder material supplied from the material inputting device into the die when the charger frame is moved backwardly.

It is preferable that the tapered surface forming means comprises a tapered surface forming cylinder vertically provided on the front side in the moving direction of the material inputting device, and a horizontal bar attached to the cylinder which crosses perpendicularly to the moving direction, wherein the cylinder is controlled to be extended at the start of the backward movement of the charger frame and to be sequentially contracted during the backward movement of the charger frame.

When the material is supplied to the die, it is preferable that the apparatus is constructed in a manner such that a lower ram is relatively elevated in relation to the die in order to reduce a drop height of the powder material (inputting drop height), and thereafter, the lower ram is relatively lowered in relation to the die and the raw material is supplied completely.

According to the scaling type material supplying apparatus for the powder molding machine of the present invention being constructed as described above, after a material was supplied from the scaling device to the material inputting device, the first cylinder is extended, the material inputting device is forwardly moved and stopped at a position just below the rotary blades, and then, the material is stirred by the rotary blades. Thus, segregation of the material is prevented and the material is uniformly mixed. The material inputting device is further forwardly moved until a position over against the die, and the lower ram is relatively elevated in relation to the die. Then, the second cylinder is extended, the shutter frame is backwardly moved, and the material inputting device is opened, thereby supplying the material into the die at a small drop height. The lower ram is lowered in relation to the die and the supplying of the material to the die is completed. After that, the material inputting device is moved backwardly, the tapered surface molding cylinder is extended at the start of the backward movement, and the cylinder is sequentially contracted during the backward movement of the material inputting device. A tapered surface which is upwardly inclined toward the backward direction is formed on the surface of the material in the die by the horizontal bar of the tapered surface molding cylinder.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 4 to 8 are side sectional views for explaining the operating steps, respectively.

DETAILED DESCRIPTION OF THE PREFERRED EMBODIMENT

An embodiment of the present invention will be described hereinbelow with reference to drawings of FIGS. 1 to 8.

Figure 1:
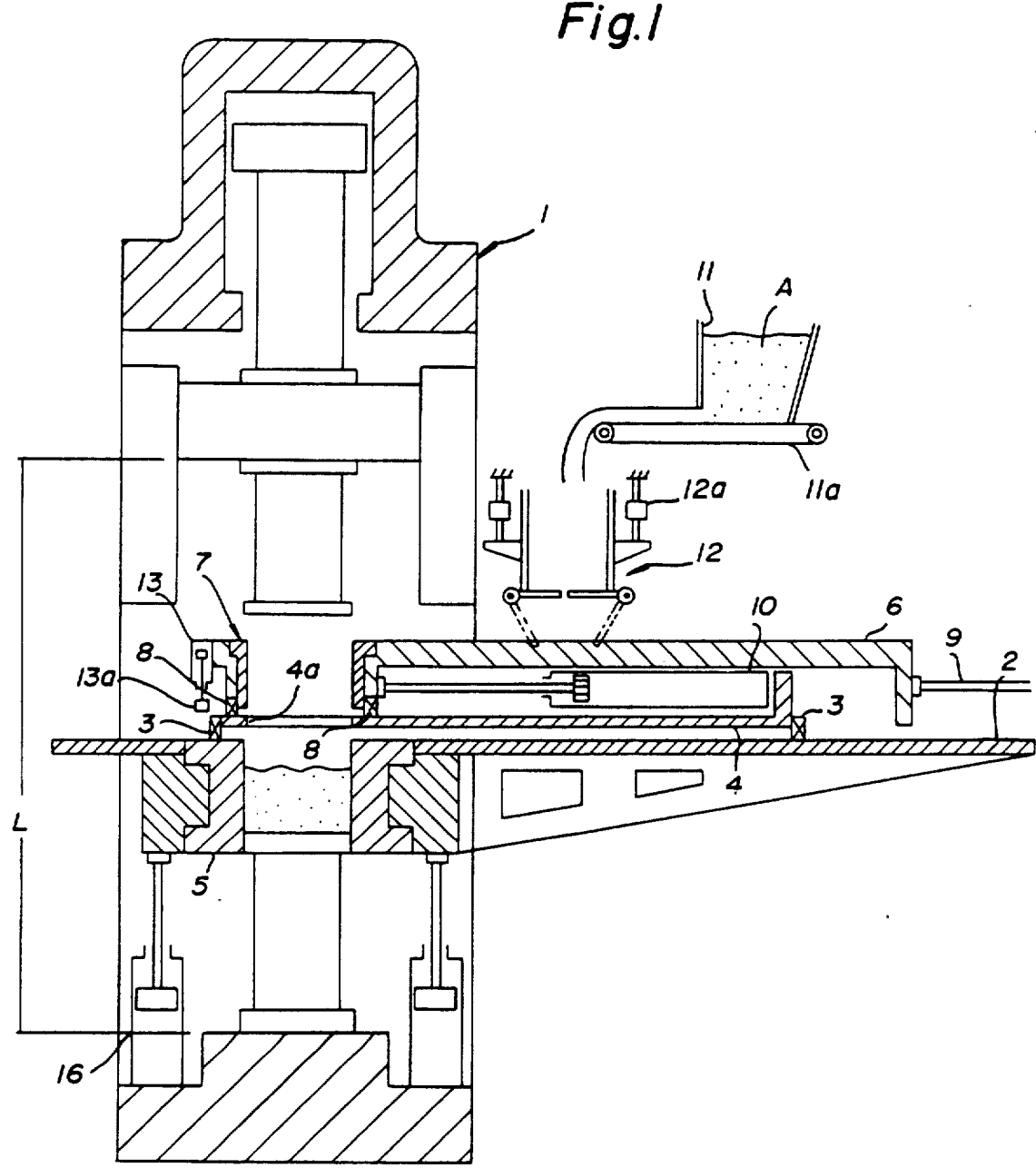
FIG. 1 is a side sectional view showing an embodiment of the present invention.
Figure 2:
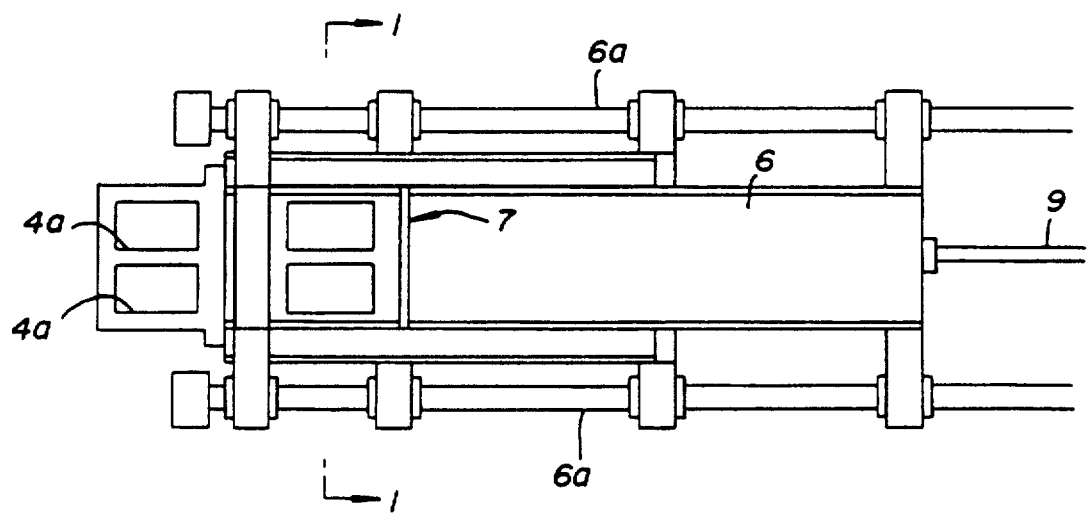
FIG. 2 is a plan view of a main portion.
Figure 3:
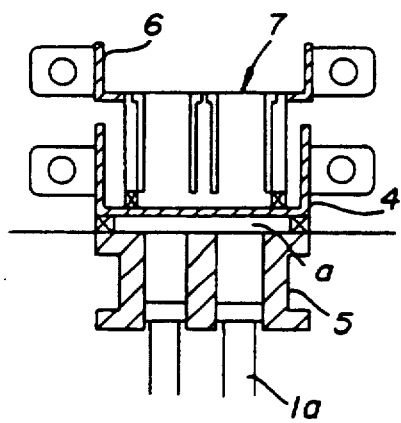
FIG. 3 is a cross-sectional view taken along the line I—I in FIG. 2.

In FIGS. 1 to 3, a powder molding machine 1 of the die floating central molding type is shown for simultaneously molding two bricks in parallel by a well-known technique. The die 5 is provided on the powder molding machine and can be freely elevated and lowered by the floating cylinders 16. A horizontal table 2 is adjacent to and surrounding the die 5. A shutter plate 4 is provided over the upper surface of the table 2 having a dust seal 3 with a small gap a (refer to FIG. 3) of, for instance, 0.1 mm, so that the shutter plate 4 is slidable in the front-/back directions (right/left directions in the drawings). A pair of opening portions 4a, 4a are formed in the shutter plate 4. A raw material inputting device 7, in slide contact with the shutter plate 4 through a dust seal 8 is provided to face the opening portions 4a. A left end portion of a charger frame 6 which extends horizontally to the right is coupled to the material inputting device 7. A right end portion of the charge frame 6 is coupled to a hydraulic or pneumatic first cylinder 9. A hydraulic or pneumatic second cylinder 1? is interposed between the charger frame 6 and the shutter plate 4. A tapered surface forming means which includes cylinder 13 is provided in the front side portion of the material inputting device 7. A horizontal bar 13a which perpendicularly crosses in the front/back directions is provided for the cylinder 13.

FIG. 2 shows guide bars 6a for guiding the shutter plate 4 for the charger frame 6. In place of the guide bars 6a, a box-type guide may be also used, or the charger frame 6 can be also attached to a roller type truck which rides over the shutter plate 4 and carries the charger frame 6.

The scaling device 12 including the load cell 12a is arranged over the charger frame 6. The conveyer 11a for measuring and transporting the raw material stored in the hopper 11 to the scaling device 12 is arranged over the scaling device 12.

As shown in FIG. 4, a vertical rotary shaft stirring blade device 14 driven by a motor is arranged in front of the scaling device 12. The stirring blade device 14 is elevated and lowered by a hydraulic or pneumatic cylinder 15. The inner surface of the hopper 11 has a structure such that any powder material does not deposit.

Upon operation, a material A, is measured and supplied from the material hopper 11 and conveyed by the conveyer 11a. The material is scaled to a value having an accuracy of a range within, for instance, ±10 g by means of the load cell 12a of the scaling device 12.

Next, as shown in FIG. 4, with the cylinder 9 contracted and the cylinder 10 contracted, the charger frame 6 is backwardly moved, and the material inputting device 7 faces the scaling device 12. The shutter 12b is opened and the material A is supplied to the material inputting device 7.

Next, the cylinder 9 is extended, the material inputting device 7 is forwardly moved from the state of FIG. 4, and the material inputting device 7 is stopped at a position below the vertical shaft stirring blade device 14. The cylinder 15 is extended, the blade device 14 descends, the material A is stirred, and segregation is prevented, thereby providing uniform mixing of the material A.

Then, the cylinder 15 is contracted and the blade device 14 is lifted up to the original position. As shown in FIG. 5, the cylinder 9 is further extended, the charger frame 6 is forwardly moved, and the material inputting device 7 is stopped at the position over the die 5.

Subsequently, as shown in FIG. 6, the floating cylinder 16 is contracted, the die 5 is lowered, and a lower ram 1a of a powder molding machine 1 is lifted up in relation to the die 5 until the upper face of the lower ram is at a position near the shutter plate 4. The cylinder 10 is extended, the shutter plate 4 is backwardly moved, the opening portions 4a face the material inputting device 7, and the material A is supplied to the die 5.

Therefore, the drop height upon supplying of the material A is very small, and an area that the material A comes into contact with the frame 6 (movement contact area of the material A) is set to a small area. In this embodiment, the movement contact area of the material 11 is an area which faces the material inputting device 7 of the shutter frame 4. Also, the abrasion of members by the material A and the spill of the material A is minimized.

Then, as shown in FIG. 7, the floating cylinder 16 is extended, the die 5 is lifted up, the lower ram 1a descends in relation to the die 5, and the material A is completely supplied to the die 5.

Figure 8:
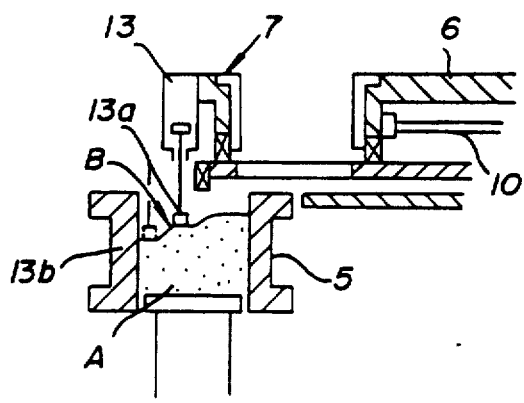
Figure 9:
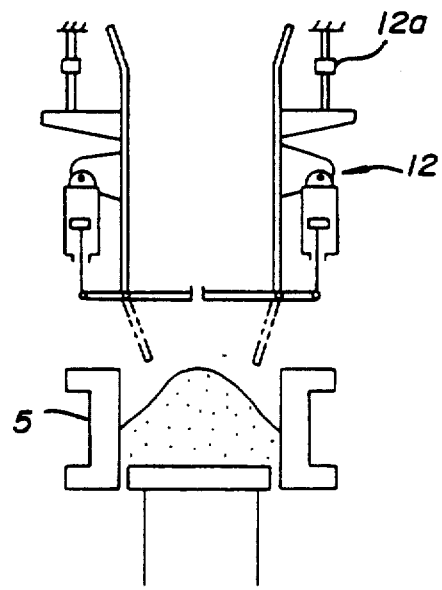
FIGS. 9 and 10 are diagrams for explaining conventional apparatuses of the weight measuring type and the volume measuring type, respectively.
Figure 10:
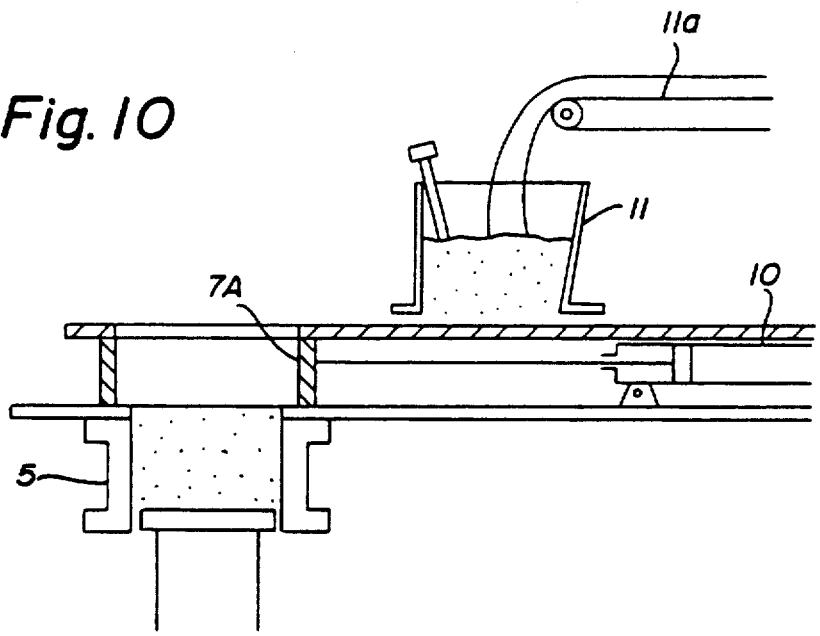

In this state, when the cylinder 9 is contracted and the charger frame 6 starts to move backwardly, as shown in FIG. 8, the cylinder 13 is extended, the horizontal bar 13a descends until a position 13b indicated by a broken line, the cylinder 13 being sequentially contracted during the backward movement of the charger frame 6, and a tapered surface B which is upwardly backwardly inclined is formed on the surface of the material A in the die 5 by the horizontal bar 13a.

Since the present invention has been constructed as described above, scaling accuracy is improved, spill of the material is minimized, the material in the material inputting device is uniformly mixed, the material is supplied into the die at the minimum drop height, the weight tolerance error of the products can be minimized, clean circumstances are obtained, and productivity can be improved.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A material supplying apparatus for a powder molding machine including:
   a press table;
   a charger frame movable to reciprocate laterally on said press table;
   means for reciprocating said charger frame;
   a material inputting device provided on said charger frame into which a powder material is supplied;
   a scaling means including a load cell for scaling the powder material to a predetermined weight, said scaling means being located above said material inputting device when said charger frame is moved to a loading position; and
   stirring means adjacent said scaling means, said stirring means including means for rotating a vertical shaft having blades attached thereto and means mounting said vertical shaft for reciprocating movement to raise and lower said vertical shaft and blades, whereby said vertical shaft and blades may be moved into and out of said material inputting device to stir the material supplied to the material inputting device without interfering with said lateral reciprocating movement of said charger frame.

2. A material supplying apparatus for a powder molding machine according to claim 1, wherein said means for reciprocating said charger frame comprises a first cylinder which is reciprocated on the press table; and said apparatus further comprises:
   a shutter plate arranged between the material inputting device and said table in sliding contact with both the material inputting device and said table through dust seals for opening and closing openings of the material inputting device; and
   a second cylinder interposed between the shutter plate and the charger frame.

3. A material supplying apparatus for a powder molding machine according to claim 1, further comprising:
   a tapered surface forming means for forming a tapered surface on the powder material supplied from the material inputting device into a die when the charger frame is moved backwardly.

4. A material supplying apparatus for a powder molding machine according to claim 3, wherein the tapered surface forming means comprises a tapered surface forming cylinder vertically provided on a front side in the moving direction of the material inputting device, a horizontal bar attached to the cylinder which crosses perpendicularly to the moving direction, and means for extending said cylinder at the start of a backward movement of the charger frame and gradually contracting said cylinder during said backward movement of the charger frame.

* * * * *